INVENTORS
Raymond B. Eden
Frank B. Maly
BY
Murray, Sackhoff & Murray
ATT'YS

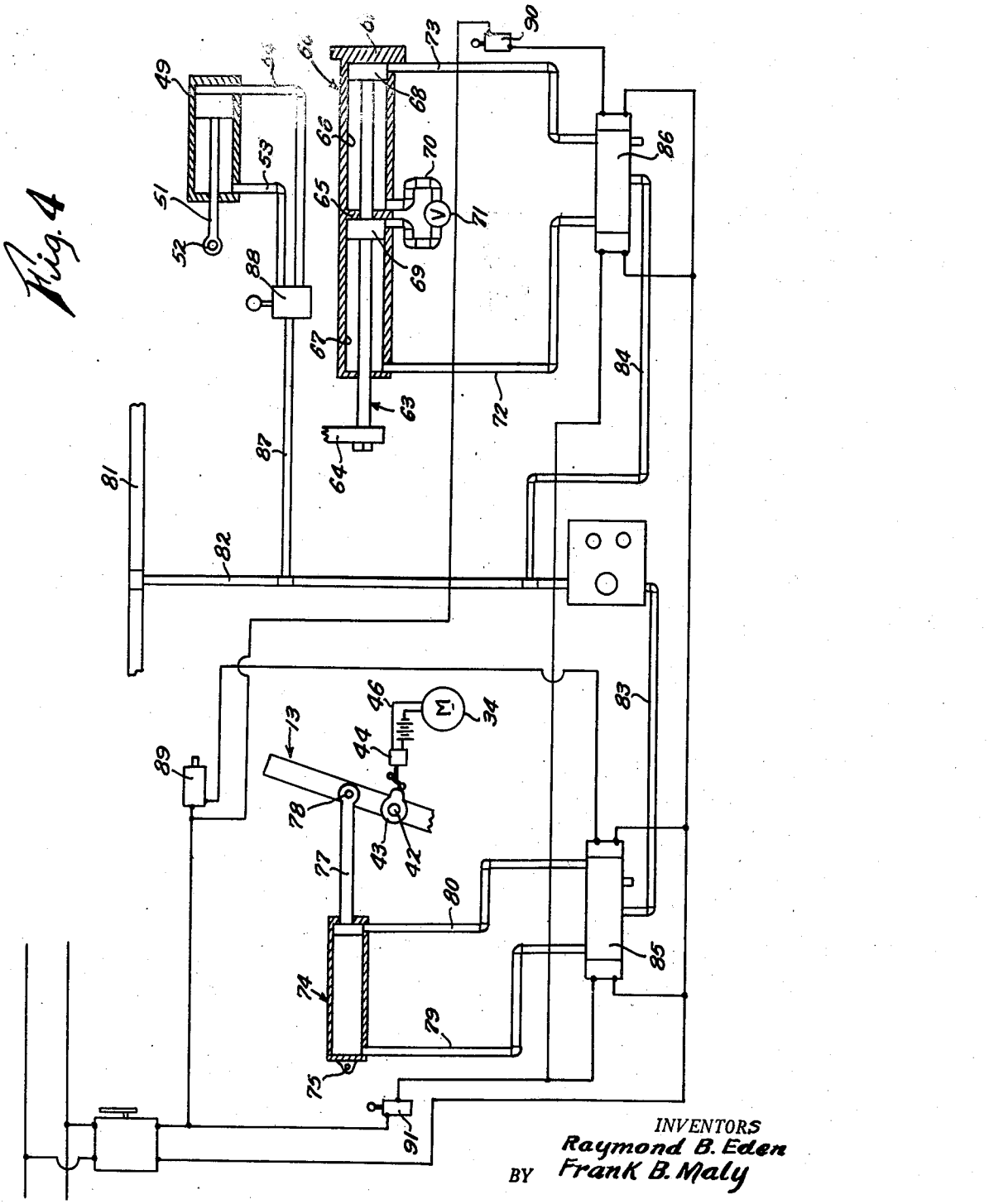

United States Patent Office 2,828,783
Patented Apr. 1, 1958

2,828,783
COPYING LATHE

Raymond B. Eden and Frank B. Maly, Antigo, Wis., assignors to Vulcan Corporation, Portsmouth, Ohio, a corporation of Ohio Application July 30, 1956, Serial No. 601,049

5 Claims. (Cl. 142—7)

The present invention relates to improvements in copying lathes and is particularly directed to novel operating instrumentalities for lathes that reproduce irregular objects such as shoe lasts, or the like.

An object of this invention is to provide a positive, fluid pressure operated sequence of automatically coordinated mechanisms applicable to copying lathes of the character described, which will materially reduce the time required to turn shoe lasts and will, to a great extent, require less supervision by the machine operator during the turning operation.

Another object of the invention is to provide in a lathe having the foregoing mechanism an automatic means operable to stop the finished work block chuck in an upright position for unchucking and the chucking of a new work block for the next succeeding turning operation.

Other objects will be apparent from the following specification taken in conjunction with the accompanying drawings which illustrate a preferred embodiment of our invention, it being understood that we are not limited to the particular structure shown except in so far as it is set forth in the appended claims.

In the drawings, wherein like reference numerals indicate similar parts throughout the several views:

Fig. 4 is a diagrammatical view of the pneumatic-electrical system for operating the last lathe of the invention.

Figure 1:
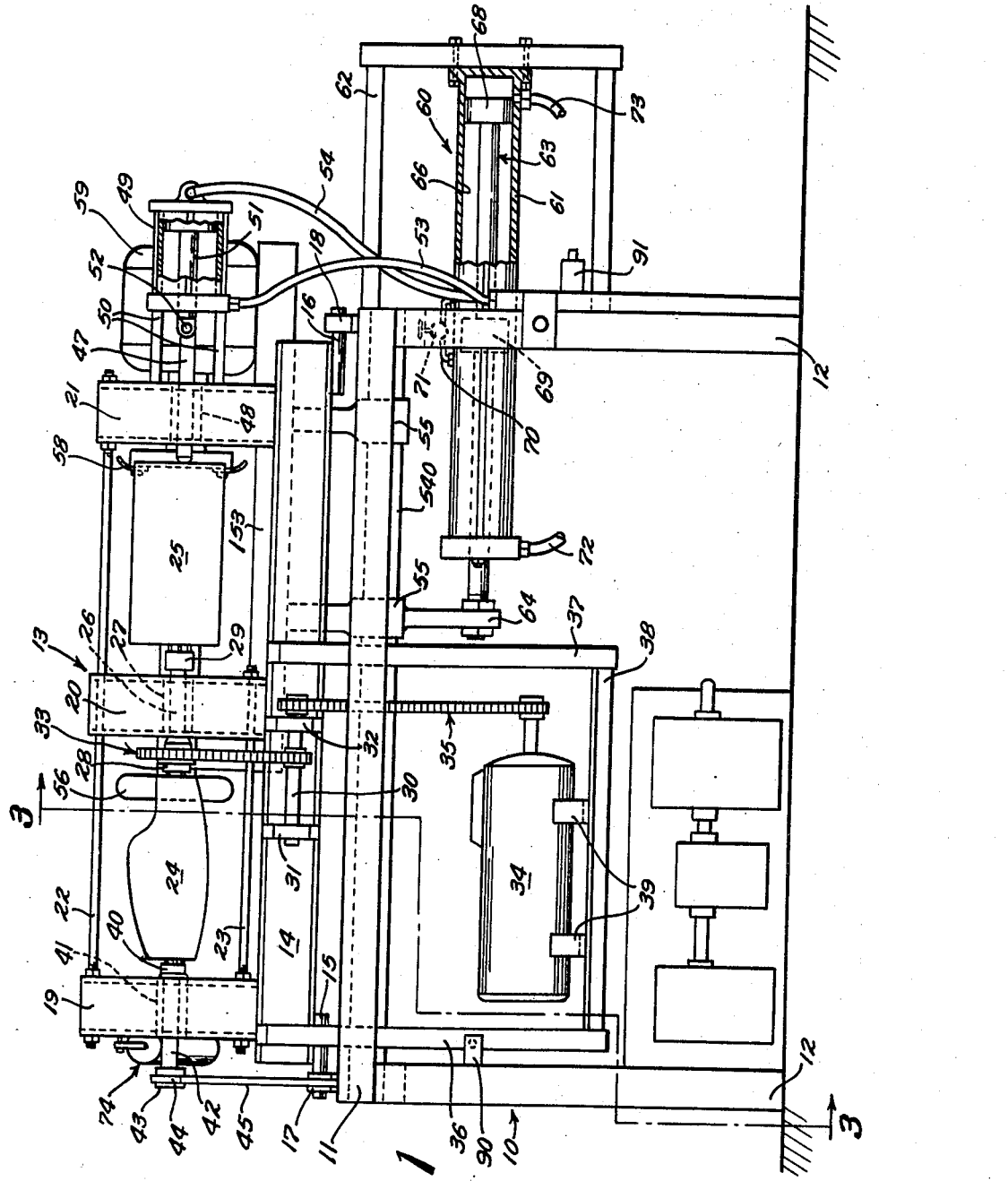
Fig. 1 is a front elevational view of a last lathe embodying our invention, some parts being broken away and other parts shown in section.

The embodiment of the invention herein described is applicable to any type of copying lathe and as shown in the drawing it is utilized on a lathe for making rough turned shoe last blocks from blocks of wood. With reference to the drawing the numeral 10 indicates a lathe base that has a horizontal, rectangular bed 11 supported upon corner positioned legs 12. A swing frame 13 is pivoted at its lower end upon the forward side of the bed 11 and comprises a longitudinal channel member 14 pivotally supported at its ends by stub shafts 15 and 16 welded to the member and each journaled in an end bearing 17 and 18, respectively, secured to the bed. Three upstanding swing frame members 19, 20 and 21 (Fig. 1) are welded to the upper flange of the channel member 14 in longitudinal spaced apart positions, the members being held together in a rigid frame structure by longitudinal tie rods 22 and 23.

Figure 3:
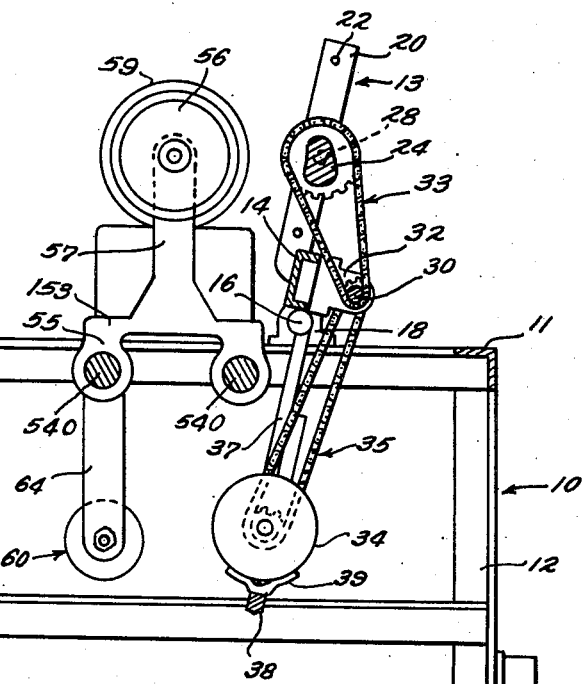
Fig. 3 is a section taken on line 3—3 of Fig. 1.

A model 24 and a work block 25 are rotatably chucked on the swing frame by means of a driven shaft 26 journaled intermediate its ends in a bearing 27 positioned on the central frame member 20, one end of said driven shaft having a model toe dog 28 fixed thereto whilst the opposed end of the shaft has a work block heel dog 29 mounted thereon. The shaft 26 is driven from a countershaft 30 that is journaled in a pair of spaced bearings 31 and 32 fixed to the swing frame member 14, the said shafts being connected by a sprocket and chain arrangement 33 while the countershaft is driven by a motor 34 connected to said countershaft by a sprocket and chain arrangement 35. The motor 34 is carried by the swing frame on two spaced apart arms 36 and 37 suitably welded at their upper ends to the member 14 and depending therefrom in the plane of the frame and into the base, the lower ends of said arms being connected by a cross bar 38 to which the motor is fastened by brackets 39—39. It will therefore be understood with particular reference to Fig. 3 that the swing frame 13 and the motor and its supporting arms are mounted on the base for rocking movement on the pivot shafts 15 and 16 and that the weight of the motor acts as a stabilizing, counter force urging the frame toward the vertical position when it is in an inclined position on either side of the vertical.

A model heel dog 40 is journaled in a bearing 41 mounted in the frame member 19, said dog having an integral shank portion 42 extending beyond the frame and carrying a cam 43 that controls a limit switch 44 mounted on a standard 45 on the base and interposed in the electric circuit 46 (Fig. 4) for the motor 34 that rotates the model and the work block. An axially movable work block toe dog 47 is slidably mounted in a sleeve 48 fixed in the frame member 21, said dog being coaxial with the work block heel dog 29 on the driven shaft 26. The dog 47 is moved axially into and out of chucking engagement with the work block by a pressure fluid actuated piston-cylinder assembly 49 mounted on the frame member 21 by arms 50—50 and connected to the piston rod 51 of the assembly by a pivot joint 52. By alternately introducing fluid under pressure into opposed sides of the assembly 49 through lines 53 and 54 the work block is chucked before the turning operation thereon and the finished work is unchucked after said operation.

A follower and cutter carriage 153 is mounted upon the base 10 for translatory movement relative to the swing frame, the mechanism for this purpose being a pair of spaced apart rods 540 extending across the center of the bed 11 and anchored at their ends in the base members, the rods being slidably received in supports 55 depending from the carriage. A follower 56 is rotatably mounted on a standard 57 upon the carriage and a cutter 58 is fixed to the driven shaft of a motor 59 mounted on the carriage with its said shaft in coaxial alignment with the follower 56.

The carriage it translated relative to the swing frame by a fluid pressure actuated cylinder-piston assembly 60 that has a fixed cylinder part 61 bolted to a yoke 62 that in turn is welded to the base 10, whilst the piston part 63 thereof is connected to an arm 64 depending from a support 55 on the carriage 153. The cylinder part is divided by a web 65 into two chambers 66 and 67 in which pistons 68 and 69 of the part 63, respectively, reciprocate. The adjacent ends of the cylinders are connected by a line 70 in which an adjustable valve 71 is interposed, pressure fluid being alternately introduced through lines 72 and 73 into the ends of the cylinder to reciprocate the piston part 63. The adjacent ends of the cylinders are filled with oil and create a head of fluid that is metered through valve 70, against which the piston must work in both phases of its reciprocation, much in the nature of the usual dash pot device, thus producing a controlled and even motion for the carriage.

The swing frame is operated by a pressure actuated piston-cylinder arrangement 74 pivotally mounted at 75 upon a standard 76 fixed to the bed 11 of the lathe, the piston rod 77 of the arrangement being pivotally connected at 78 to the frame member 19. By introducing fluid pressure into one side of the cylinder through line 79 the swing frame is moved to its inoperative position on one side of its vertical position, whilst introduction of pressure fluid into the opposed side of the cylinder through line 80 will move the frame to the opposite side of the vertical position to and into its resiliently vibratile operative position with the follower and cutter engaging the model and work block, respectively. By maintaining constant air pressure in the cylinder through line 80 the follower will be urged firmly against the rotating model, thus causing the frame to vibrate in response to the change of contour in the model.

The operation of the lathe will now be described, particular reference being had to Fig. 4; wherein the numeral 81 indicates a compressed air line which preferably constitutes the source of fluid pressure for the lathe. A fluid pressure supply line 82 is connected to the main line and branches into lines 83 and 84 which in turn are connected to conventional solenoid operated two-position valves 85 and 86, respectively, that control the cylinder-piston assembly 74 for the swing frame and the piston-cylinder assembly 60 for the carriage, respectively. The piston-cylinder assembly 49 for the work block chuck is connected to the supply line 82 by a line 87 that has the usual manually controlled two-way valve 88 interposed therein.

Figure 2:
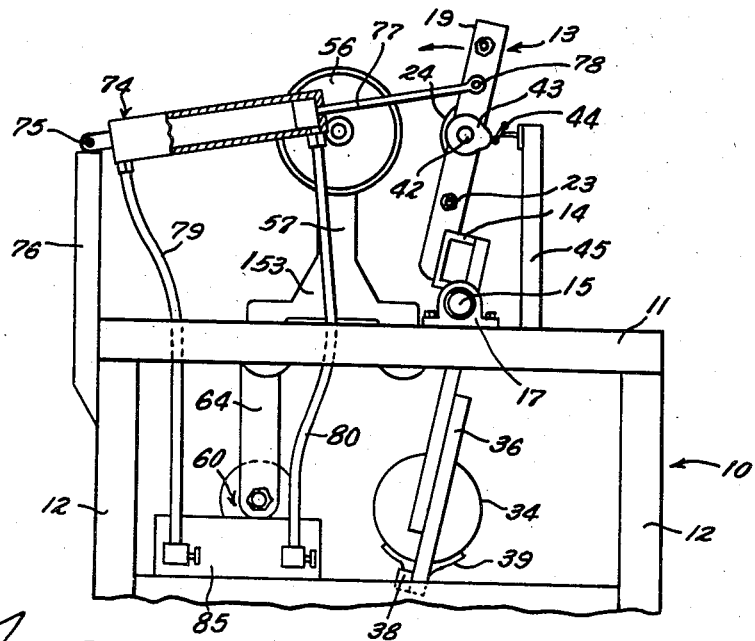
Fig. 2 is a fragmental, side elevational view of the last lathe, parts thereof being shown in central section.

The lathe is operated by placing a work block between the dogs 29 and 47 and then moving the valve 88 to admit pressure fluid into the piston-cylinder through line 54 which moves the dog 47 into chucking position against the work block. The cutter motor 59 may then be energized and the motor remains operative during use of the lathe. Next a manual electric starting switch 89 is operated which actuates the solenoid valve 85, which in turn connects the pressure branch line 83 with the line 80 to move the swing frame from its inoperative position, illustrated in Fig. 2, to its resiliently vibratile position with the model and work block engaged by the follower and cutter, respectively. As the swing frame leaves its said inoperative position the cam 43 is disengaged from the limit switch 44 which closes the electric circuit 46 to the motor 34 thus starting the motor 34 which drives the model and work block in unison through the chain and pulley arrangements 33 and 35. Thus the model and work block are rotating as the swing frame is pulled by the piston-cylinder 74 into its operative position and as the swing frame attains its said operative position the frame arm 36 (Fig. 1) contacts a limit switch 90 which energizes the solenoid actuated valve 86 to connect fluid pressure branch line 84 with the line 54 to initiate the feed stroke of the carriage 153 which then translates the cutter and follower relative to the rotating model and work block. As the carriage completes its feed movement the carriage yoke 62 contacts and actuates a limit switch 91 (Fig. 1) which electrically actuates the solenoid valves 85 and 86 which respectively introduces pressure fluid from the branch line 83 into the line 79 of the pressure cylinder 74 to return the swing frame 73 to its inoperative position and also connects branch line 84 with line 53 to operate the cylinder 60 for return of the carriage to its inoperative position. It will be noted that as the swing frame 13 approaches its inoperative position the raised part of the rotating cam 43 will contact the limit switch 44 which opens the latter and deenergizes the drive motor 34 for the follower and work block. The raised part of the cam is angularly positioned on the dog 42 in position that when it contacts the limit switch the model 24 will be in the upright position illustrated in Figs. 1 and 3. The finished work block 25 is now removed from the swing frame by operating the valve 88 which connects the pressure line 87 with line 55 to operate the piston-cylinder 49 and retract the dog 47 from the said block. Another work block is then chucked for the next succeeding turning operation.

What is claimed is:

1. A last lathe comprising a base, a swing frame pivoted on the base, a model and work block chucking means mounted on the swing frame, power means for rotating the model and work block in unison, a follower and cutter carriage slidably mounted on the frame for translatory movement relative to the swing frame, a first fluid pressure actuated cylinder mounted on the base and connected to the swing frame, a two-position valve for actuating said cylinder that in its first position admits pressure fluid to one side of the cylinder to laterally rock the frame to and into a resiliently vibratile position adjacent the carriage where the follower and the cutter respectively engage the model and the block, and that in its second position admits fluid pressure to the opposed end of the cylinder to return the frame to its said inoperative position, a second fluid pressure cylinder mounted on the base and connected to the carriage, a second two-position valve for said second cylinder that in its first position admits fluid pressure to the second cylinder to feed the carriage in work forming direction and that in its second position admits fluid pressure to the opposite side of the said second cylinder to return the carriage, a manual switch means for moving the first valve to its first position, switch means operated by the frame as it initially attains its vibratile position for moving the second valve to its first position, and switch means operated by the carriage at the end of its work forming stroke for moving the first and the second valves to their respective second positions.

2. A last lathe comprising a base, a swing frame pivoted on the base, a model and work block chucking means mounted on the swing frame, power means for rotating the model and work block in unison, a follower and cutter carriage slidably mounted on the frame for translatory movement relative to the swing frame, a first fluid pressure actuated cylinder mounted on the base and connected to the swing frame, a two-position valve for actuating said cylinder that in its first position admits pressure fluid to one side of the cylinder to laterally rock the frame to and into a resiliently vibratile position adjacent the carriage where the follower and the cutter, respectively, engage the model and the block, and that in its second position admits fluid pressure to the opposed end of the cylinder to return the frame to its said inoperative position, a second fluid pressure actuated cylinder mounted on the base and connected to the carriage, a second two-position valve for said second cylinder that in its first position admits fluid pressure to the second cylinder to feed the carriage in a work forming direction and that in its second position admits fluid pressure to the opposite side of the said second cylinder to return the carriage, a manual switch means for moving the first valve to its first position, switch means operated by the frame as it initially attains its vibratile position for moving the second valve to its first position, switch means operated by the carriage at the end of its work forming stroke for moving the first and the second valves to their respective second positions, a cam rotatable with the model and work block, and a switch means interconnected with and adapted upon actuation to deenergize the power means for the model and work block and fixed on the base in position for actuation when the swing frame is in its inoperative position.

3. In a last lathe having a swing frame for rotatably chucking a model and a work block, power means for rotating the model and work block in unison, and a follower and cutter carriage positioned for translatory movement relative to the swing frame in a direction parallel to the pivoted axis of said frame, the combination of a first fluid pressure actuated cylinder-piston assembly, a pressure source for the fluid, means connecting the first cylinder-piston assembly to the swing frame to laterally rock said frame from an inoperative position remote from the carriage to and into a resiliently vibratile operative position adjacent the carriage, and return, a pressure conduit leading from the source of fluid pressure, an alternate pressure and exhaust conduit leading to each side of the first cylinder-piston assembly, a first reversing valve connecting the pressure conduit and the said alternate pressure and exhaust conduits, and having two positions, namely (1) connecting the pressure conduit to one of the pressure-exhaust conduits to actuate the first cylinder to rock the swing frame to and into the resiliently vibratile operative position and (2) connecting the pressure conduit to the other pressure-exhaust conduit to actuate the first cylinder-piston assembly to return the swing frame to its remote, inoperative position, as second fluid pressure actuated cylinder-piston assembly connected to the carriage to feed and return the carriage relative to the frame, an alternate pressure and exhaust conduit leading to each side of the second cylinder-piston assembly, a second reversing valve connecting the pressure conduit to the said alternate pressure and exhaust conduits, and having two positions, namely (1) connecting the pressure conduit to one of the said pressure-exhaust conduits to feed the carriage and (2) connecting the pressure conduit to the other of said pressure-exhaust conduits to return the carriage, switch means to set the first reversing valve in position (1), a limit switch made operable when the swing frame attains its operative vibratile position to set the second reversing valve in position (1), and a limit switch made operable when the carriage reaches the end of its feed stroke to set the first and the second reversing valves each in position (2).

4. In a last lathe according to claim 3 characterized by the fact that the source of fluid pressure is a pneumatic pump.

5. In a last lathe according to claim 4 further characterized by the fact that the two reversing valves are actuated by solenoids and all the switches are electric switches.

References Cited in the file of this patent

UNITED STATES PATENTS

| | | |
|---|---|---|
| 723,044 | Seymour | Mar. 17, 1903 |
| 882,632 | Hanses | Mar. 24, 1908 |
| 1,690,111 | Heston | Nov. 6, 1928 |
| 1,857,986 | Turcott | May 10, 1932 |
| 2,415,465 | Cross | Feb. 11, 1947 |
| 2,501,387 | Haumann | Mar. 21, 1950 |

FOREIGN PATENTS

| | | |
|---|---|---|
| 899,273 | France | Aug. 7, 1944 |